March 5, 1957  G. HALLDORSSON  2,783,548
ROTARY DRYERS
Filed June 8, 1955  7 Sheets-Sheet 2
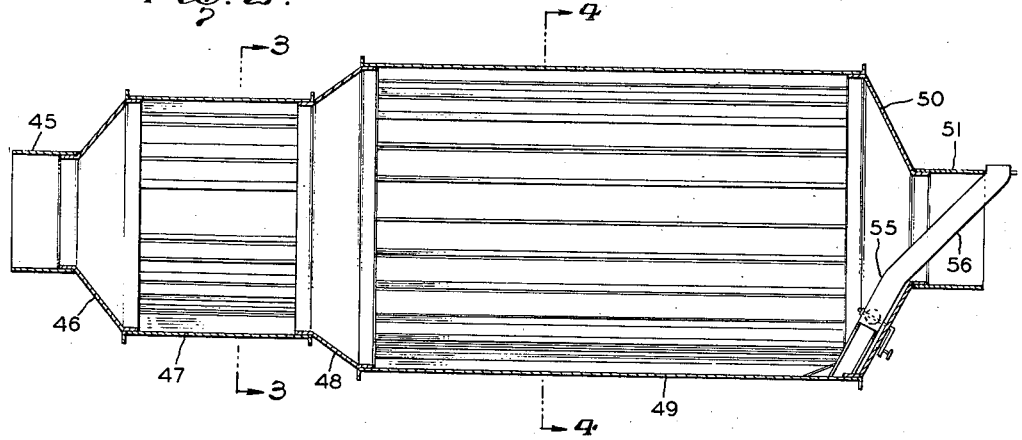
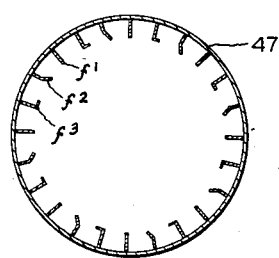
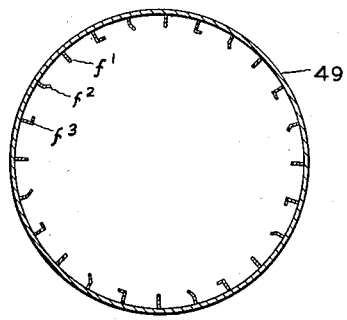
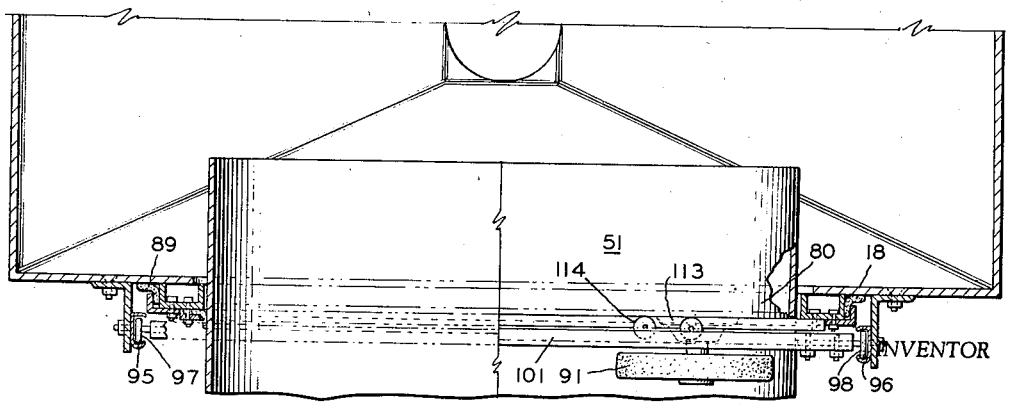
INVENTOR
Gisli Halldorsson.
BY
Cameron, Kerkam & Sutton
ATTORNEYS March 5, 1957 G. HALLDORSSON 2,783,548
ROTARY DRYERS
Filed June 8, 1955 7 Sheets-Sheet 3

INVENTOR
Gisli Halldorsson.
BY Cameron, Kerkam & Sutton
ATTORNEYS

March 5, 1957  G. HALLDORSSON  2,783,548
ROTARY DRYERS
Filed June 8, 1955  7 Sheets-Sheet 4
Fig. 7.
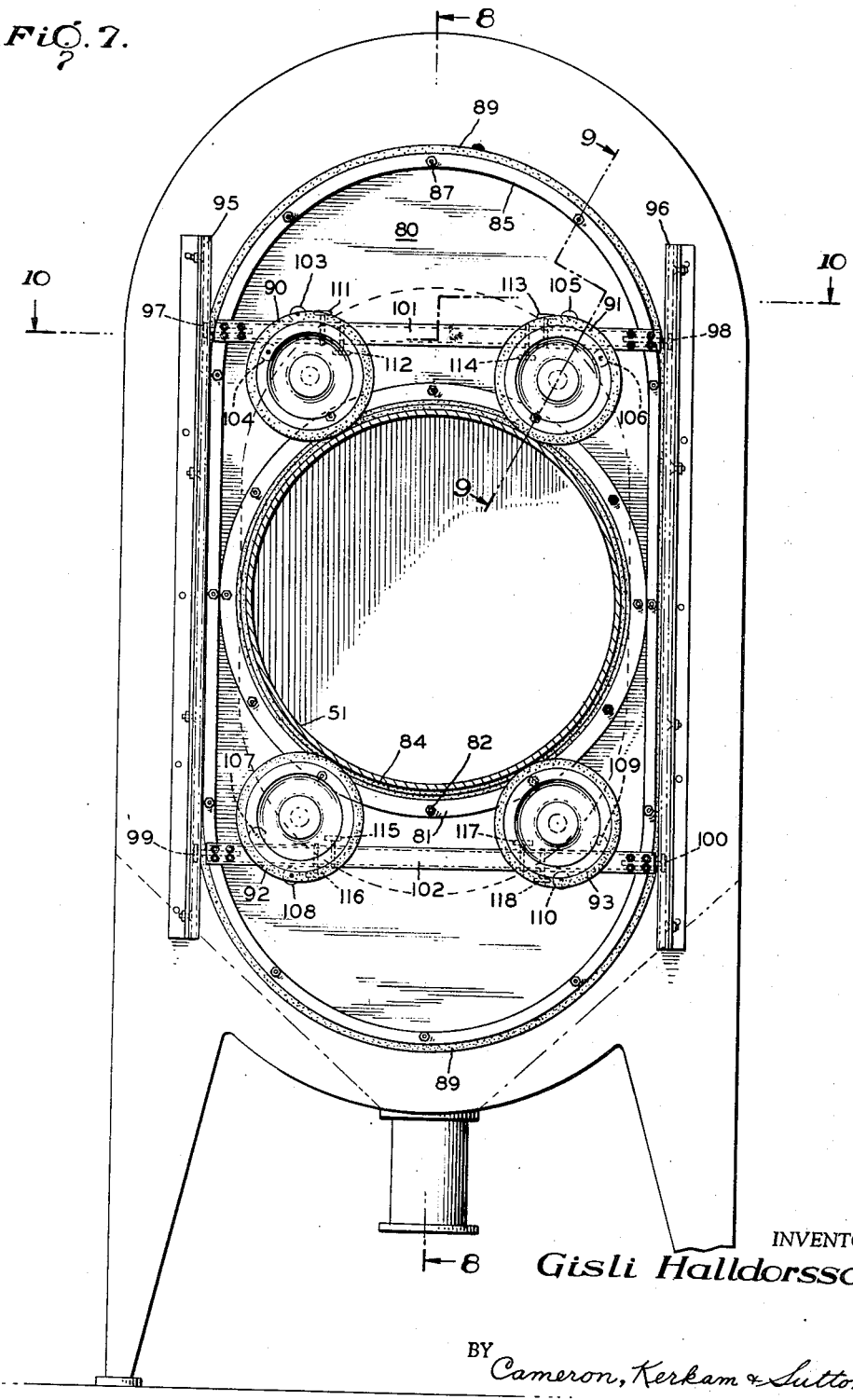
INVENTOR
*Gisli Halldorsson*
BY 
ATTORNEYS March 5, 1957  G. HALLDORSSON  2,783,548
ROTARY DRYERS
Filed June 8, 1955  7 Sheets-Sheet 5

INVENTOR
Gisli Halldorsson.
BY Cameron, Kerkam & Sutton
ATTORNEYS

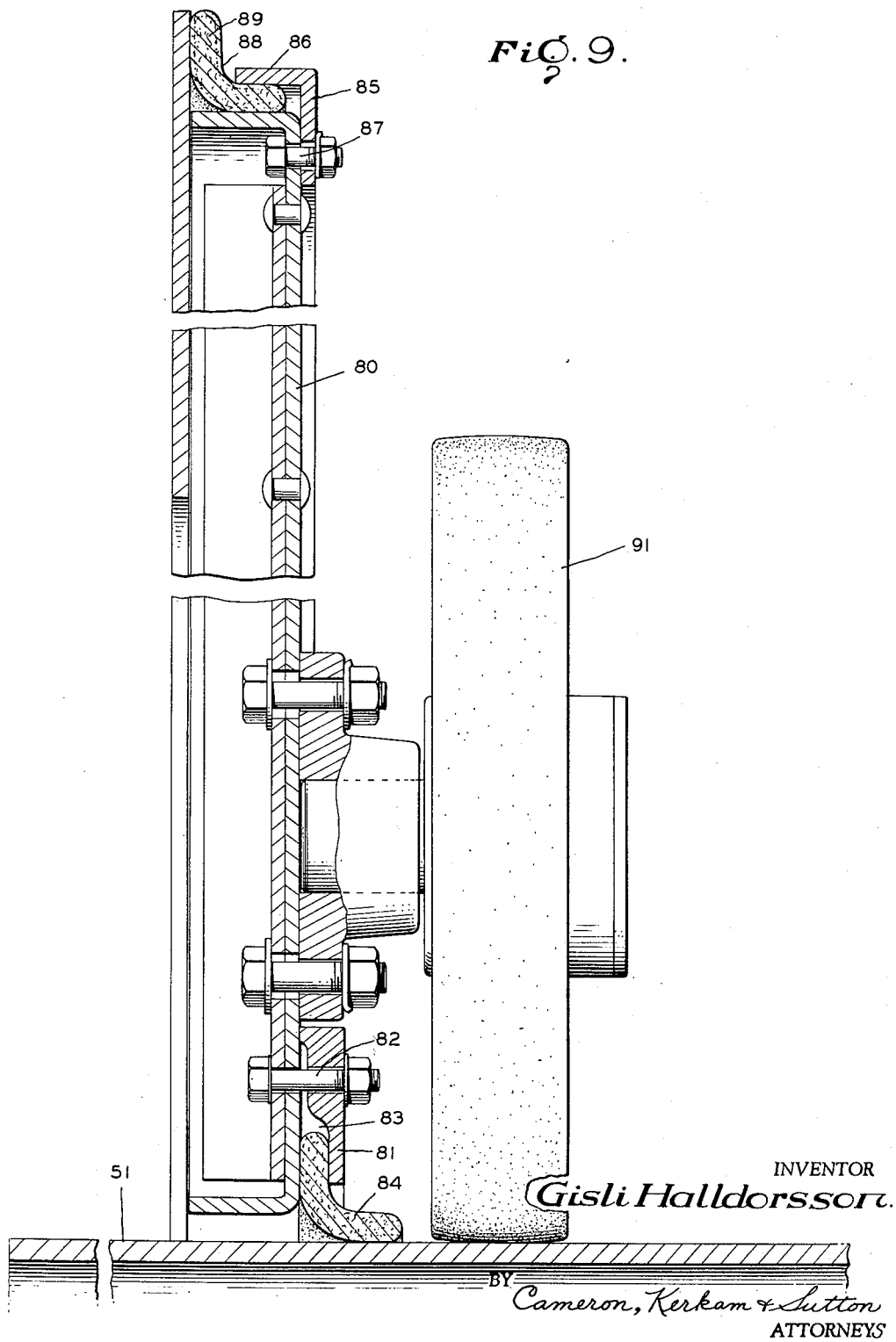

INVENTOR
Gisli Halldorsson.
BY Cameron, Kerkam & Sutton
ATTORNEYS

United States Patent Office 2,783,548
Patented Mar. 5, 1957

2,783,548
ROTARY DRYERS

Gisli Halldorsson, Baltimore, Md., assignor to Edw. Renneburg & Sons Co., Baltimore, Md., a corporation of Delaware Application June 8, 1955, Serial No. 514,081

13 Claims. (Cl. 34—79)

This invention relates to an improved rotary dryer for various types of comminuted material and incorporates certain improvements over the dryer structure disclosed in my copending application, Serial No. 343,539, now Patent No. 2,715,283.

The invention comprises broadly a rotary drum dryer consisting of a narrow entrance neck portion which opens into an elongate portion of considerably larger diameter, which in turn opens into an elongate retention section of greatly enlarged diameter which is then reduced to an exit neck of small diameter and comparatively short length. The drying air is pulled through the dryer by means of an industrial type fan which is disposed in an airtight housing adjacent the discharge end of the dryer and in communication therewith. The drying air is preferably heated by means of a steam coil furnace or other heat exchanger which is positioned adjacent the inlet or feed end of the dryer and which is provided with control louvers at its outer face to regulate the flow of air therethrough and thence into the entry neck of the dryer. If desired an oil or gas fired furnace may be utilized for heating the drying air.

The control of the dryer is maintained through thermocouples which are located adjacent the inlet and discharge ends of the dryer and which are arranged in circuit with potentiometers which control a source of compressed air to air motors controlling the inlet louvers at the furnace and louvers at the exhaust end of the dryer to maintain the temperatures therein at the desired relation.

The entire rotating dryer structure is driven by paired drive rollers which preferably are provided with heavy neoprene tires which frictionally engage scored drive bands provided about the terminal peripheries of the enlarged retention section thereof. A pair of opposed idler rollers are provided opposite the drive rollers to support the dryer body upon a platform or base which is preferably pivotally mounted upon trunnions or bearings and is angularly adjustable by means of a hydraulic jack structure at one extremity whereby the longitudinal inclination of the dryer drum may be varied as desired to regulate the speed of delivery of material therethrough.

An improved unloading pipe structure is provided at the discharge end of the dryer, passing through the discharge neck, to regulate the removal of dried material therefrom and to eliminate the dusting problem attendant upon prior structures.

The improved dryer structure is so designed and controlled as to be completely automatic in operation and has a high efficiency and a greater capacity than prior dryers.

It is therefore an object of the present invention to provide a rotary dryer structure in which the optimum operating temperatures are automatically maintained at the inlet and outlet ends thereof at all times.

It is a further object of this invention to provide an improved heating and control structure for the dryer.

It is another object of this invention to provide improved drive and mounting means for the dryer cylinder whereby the angularity of the dryer may be controlled and the period of retention of material therein may be regulated depending upon the nature of the material.

It is a further object of this invention to provide improved discharge structure at the discharge end of the dryer whereby the rate of discharge therefrom may be regulated as desired.

A further object of this invention is to provide improved flight structures within the dryer sections properly to regulate the showering of the material within the sections of the dryer.

A further object of this invention is to provide a dryer structure of improved configuration which will dry materials of varying particle size and moisture content completely, which will eliminate loss through burning and danger of explosion from overheating and which will provide a much greater output than prior dryers.

A further object is to provide improved sealing means at the inlet and outlet ends of the dryer to make the entire structure airtight in all positions.

Other and further objects of this invention will become apparent as this specification proceeds.

Referring to the drawings,

Fig. 2 is a longitudinal section view of the dryer drum per se, showing the disposition of the flights in each of the main dryer sections and the unloading pipe structure;

Fig. 3 is a cross-sectional view of the preliminary drying section of the drum, taken on line 3—3 of Fig. 2, showing the flight arrangement in this section;

Fig. 4 is a cross-sectional view of the enlarged retention section of the drum, taken on line 4—4 of Fig. 2, showing the flight arrangement in the retention section thereof;

Fig. 7 is an end elevation of the backbox structure showing the novel sealing plate structure against the face thereof and showing the exit neck of the dryer drum in position through the center thereof;

Fig. 9 is a partial cross-sectional view of the upper portion of the sealing plate structure, taken on line 9—9 of Fig. 7, showing details of the sealing plate structure and the seals and one of the master control rollers therefor, bearing against the dryer drum neck.

Fig. 10 is a top elevation, partially in section and broken, of the backbox and sealing plate structure, taken on line 10—10 of Fig. 7;

Figure 1:
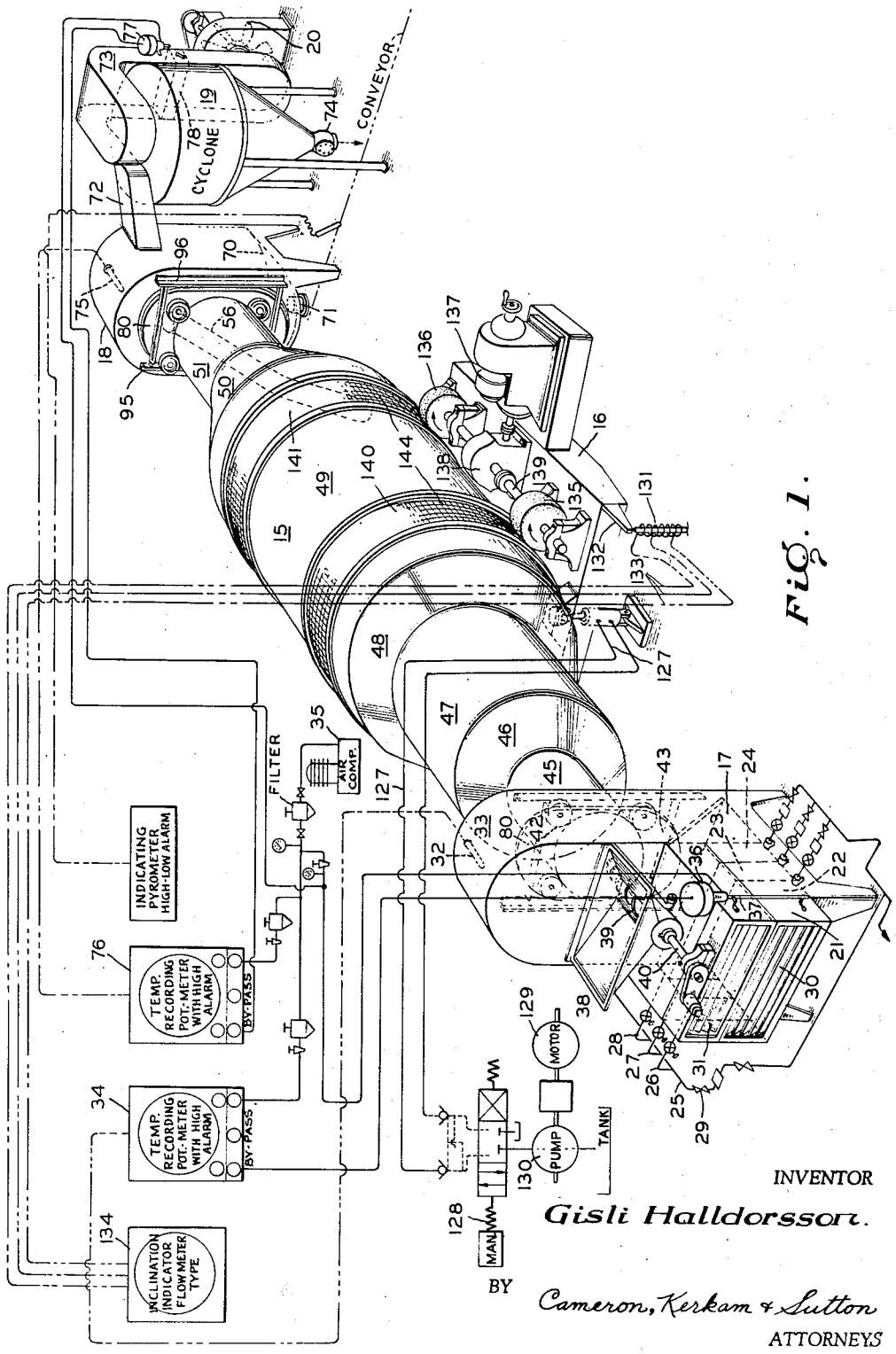
Fig. 1 is a perspective view of the entire dryer structure showing the improved dryer configuration, the controls therefor, the improved furnace structure, the improved drive mounting base, the terminal seals at the extremities of the dryer and the unloading pipe structure at the exhaust end thereof.

In the drawings, Fig. 1, 15 indicates the rotating dryer drum per se, 16 indicates broadly the drive and mounting base therefor which may be angularly inclined longitudinally to vary the angular inclination of the dryer drum 15, 17 indicates broadly the air inlet, heating and material feeding structure at the inlet end of the dryer drum, 18 indicates the backbox or discharge structure at the discharge end of the dryer drum, 19 indicates the cyclone communicating therewith, wherein the fine particles are separated out of the air stream, and 20 indicates the exhaust fan and housing which draws the heated air through the heater structure at the initial end of the dryer and through the rotating dryer drum.

As there are numerous novel features in each of the various elements of the dryer structure each element thereof will be taken up separately, from the initial end of the dryer to the final discharge structure and will be described in detail.

Referring first to the air heating and feed structure for the dryer, 21 indicates broadly the heater or furnace housing which is disposed adjacent the narrow inlet neck of the dryer drum in airtight communication therewith. Steam heater units 22, 23 and 24 are continued within the lower portion of housing 21 and are separated from the upper portion thereof by a baffle. They are supplied with steam from a master main 25 through auxiliary mains 26, 27 and 28.

A series of air dampers or louvers 30 and 31 are located in the outer face of housing 21 and are so arranged that air passing through dampers 30 passes over steam heaters 22, 23 and 24 and is heated and passes thence through the interior of housing 21 to the entry neck of the dryer. Air passing through upper louvers 31 bypasses the heating coils and passes in cool condition to the restricted entry neck of the dryer. A thermocouple 32 is located in the upper extremity of the inlet breaching 33 of the structure and is in circuit with a control potentiometer 34 which controls the flow of compressed air from an air compressor 35 to air motor 36, mounted on housing 21, which is connected through a lever system 37 to heating louvers 30 and bypass louvers 31, whereby the temperature of the heated air entering the restricted neck of the dryer is maintained at the desired point at all times during the operation of the dryer. The control system for the air inlet louvers 30 and 31 will be discussed in more detail further on in the specification.

A feed hopper structure 38 is affixed to the upper surface of the housing 21 and is provided at its lower extremity with a worm screw feed 39 which is driven from a suitable source of power by a shaft 40 to feed material into the restricted entry neck of the dryer, wherein preliminary drying of the material occurs. The speed of feed of the material into the restricted neck of the dryer may be regulated as desired by regulating the speed at which the worm screw 39 is rotated. The inner extremity of the worm screw feed and housing extends well within the narrow neck of the dryer to assure a positive feed of the material thereto.

The outer face of the inlet breaching 33 is provided with an elongate vertical opening 42 of substantially the same width as the narrow entry neck of the dryer and into which the narrow neck of the dryer extends. Elongate opening 42 is so designed that the entry neck of the dryer may move upwardly or downwardly therein as the angular inclination of the dryer drum 15 is varied, as will be discussed in more detail hereinafter.

An appropriate breaching seal structure is provided on the face of the inlet breaching, about the narrow neck of the dryer to maintain an airtight seal at all times between the face of the inlet breaching and the outer surface of the narrow neck of the dryer to prevent entry of outside air therethrough regardless of the angular disposition of the narrow neck of the dryer within the elongate orifice 42. This breaching seal 43 is preferably in the form of an elongate plate, centrally bored to closely fit the drum neck, slidably mounted against the face of the inlet breaching and provided with asbestos seal strips completely about its outer and inner peripheries bearing against the face of the inlet breaching and the outer periphery of the neck of the dryer. Sealing plate 43 is preferably slidably mounted in vertical tracks affixed to the face of the breaching and carries rectangularly disposed control rollers working on the outer periphery of the neck of the dryer to maintain the seal plate in proper position at all times to assure an airtight seal at the inlet end of the dryer. This breaching seal structure will be described in detail further on in this specification.

Referring to the dryer drum structure per se, 45 indicates the restricted entry neck of the dryer drum through which heated air is pulled at high speed, moving the material to be dried with it at such high velocity that surface moisture is evaporated, yet no burning or overheating of the material occurs. Entry neck 45 is cylindrical, of small diameter and short length and leads into a conical enlarged section 46 which joins it to a further enlarged and longer preliminary drying section 47, which is provided about its inner periphery with a series of elongate flights which will be discussed at more length further on in this specification. Dryer section 47 is of substantially twice the diameter of neck 45 and of considerably greater length. The preliminary drying of the material is accomplished in this section. Drying section 47 leads into a further conical section 48 which opens into enlarged retention section 49 of the dryer, wherein final drying of the larger particles of material is accomplished and whence the completely dried material is finally delivered through terminal conical section 50 to reduced exit neck 51. Enlarged retention section 49 is preferably approximately twice the cross sectional area and length of the preliminary drying section 47 and is provided about its inner periphery with a series of straight, angular and rectilinear longitudinal flights of reduced height, as shown in Fig. 4, which shower the material less heavily in this section to accomplish the final internal drying of the particles comprising the bulk of the material. Due to the enlarged diameter of retention section 49 air speed in this section is greatly reduced, as is air temperature. This results in a retention of all partially dried material within this section until such time as the particles are completely dried. Only extremely fine dried particles of material are pulled through retention section 49 with comparative rapidity and pass through neck 51, where air speed becomes high, to cyclone 19. The intermediate and heavier, still partially moist particles are retained in section 49 until they are completely dried. The functioning of the various sections of the dryer drum will be discussed in more detail further on in this specification. The functioning, broadly, is as follows: Air speed and temperature are at their highest in neck section 45, temperature and air speed drop in section 47 and are further reduced in enlarged retention section 49 through which the dry, light particles pass rather rapidly, the heavy, partially moist particles being retained therein until they are completely dried. Air speed again reaches a high point as the air passes through restricted terminal neck section 51 of the dryer, extremely fine dried particles being carried therethrough and separated from the air stream in cyclone 19, from the bottom of which they are appropriately taken off through a rotary air lock valve 74. The intermediate and heavier dried particles are carried out of the extremity of retention section 49 by the unloading pipe, which will be discussed in detail, further on.

Figure 5:
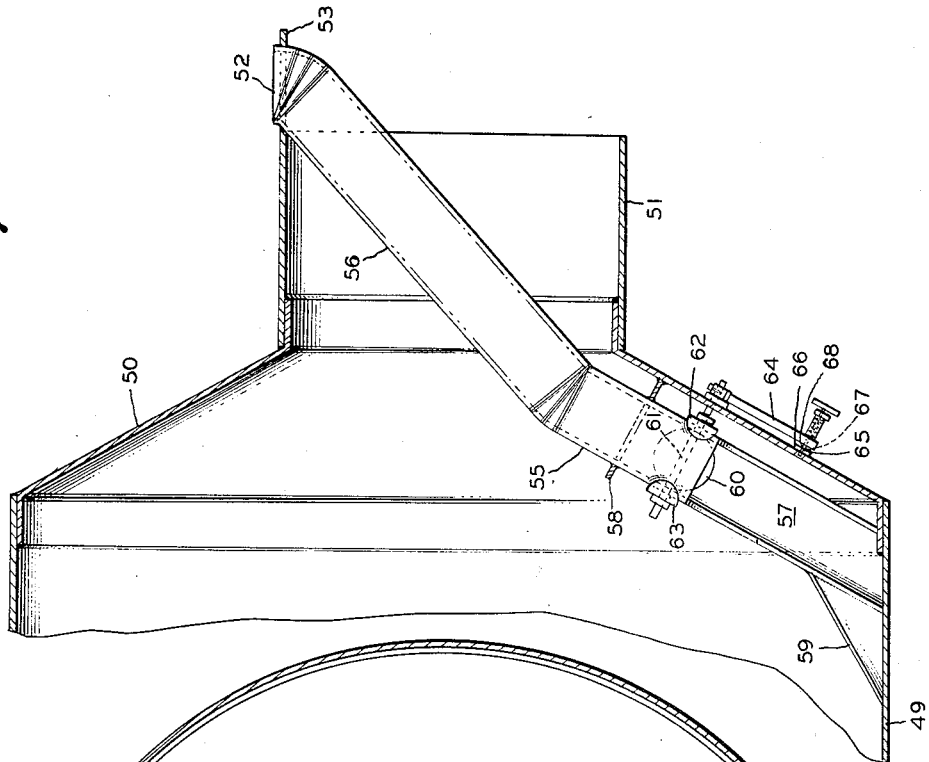
Fig. 5 is a partial cross-sectional view of the discharge neck of the dryer showing the unloading pipe mounted therein with the butterfly valve in full open position.
Figure 6:
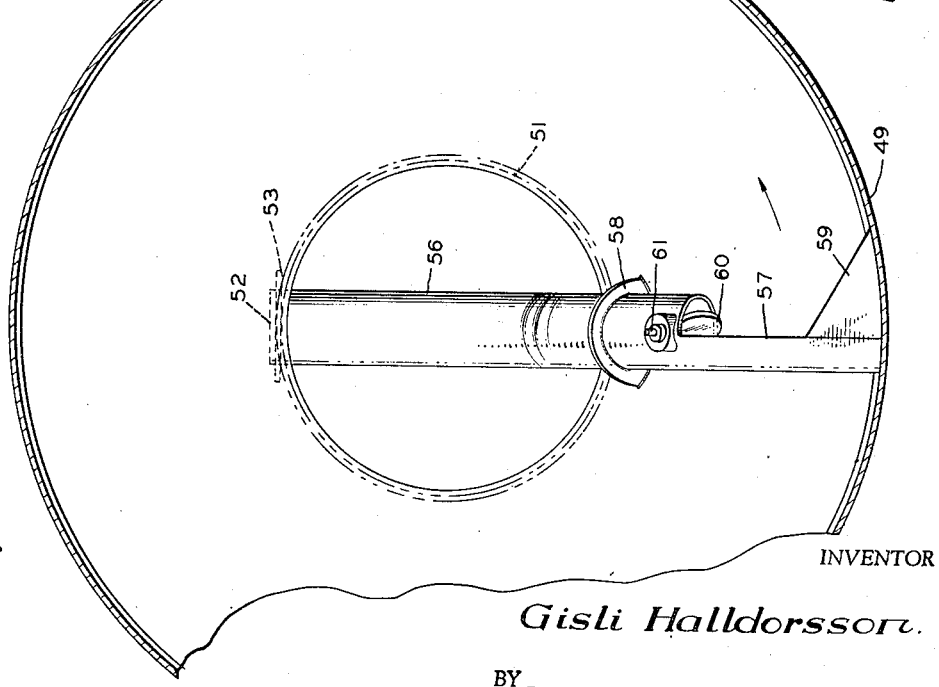
Fig. 6 is an end view, looking into the discharge neck of the drum showing the unloading pipe structure.
Figure 8:
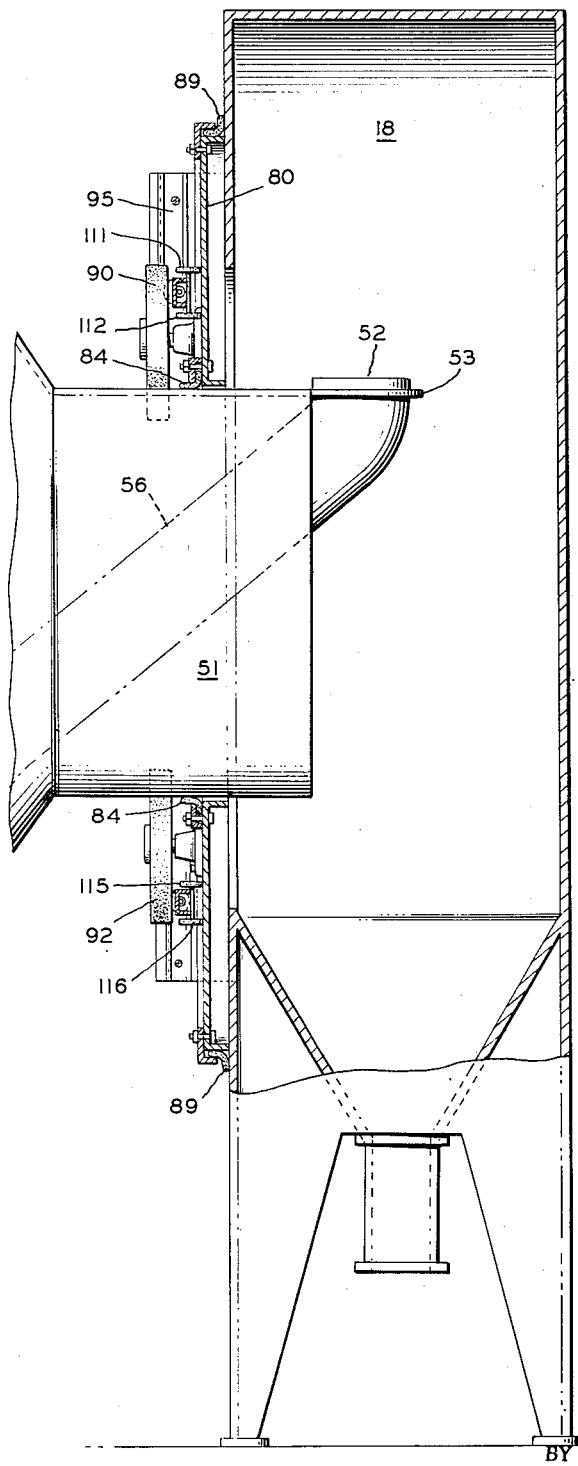
Fig. 8 is a vertical section view of the backbox structure, taken on line 8—8 of Fig. 7, showing the sealing plate structure in position against the face thereof with the discharge neck of the dryer drum in position through the center orifice of the sealing plate.

In my former structures of this type a considerable amount of the material was drawn at comparatively high speeds out through the narrow exit neck of the dryer and subsequently removed from the air stream by gravity in the cyclone separator. This method of discharge can result in considerable dusting, loss of a certain percentage of the dried material and possible explosion hazards where explosive materials, such as ammonium nitrate, are being handled. In order to avoid dusting and possible material loss an improved unloading structure has been added to the dryer drum at its discharge end, which unloading structure is shown in detail in Figs. 5 and 6 of the drawings. Referring to Figs. 5 and 6, unloading pipe 55 is provided extending from the lower extremity of the terminal end of retention section 49, upwardly through conical section 50 and is then angularly inclined into extremity 56 which passes upwardly through restricted neck 51 and is affixed at its open, outer extremity 52 to the outer edge of neck 51 by means of support 53. As is shown, unloading pipe 55 is preferably bisected into an open trough section 57 at its lower extremity, trough section 57 being open in the direction of counterclockwise rotation of the dryer. Unloading pipe 55 is maintained in position in conical section 50 by means of a bracket 58 which is affixed to the wall of conical section 50 and is bored at its center to receive pipe 55 therewithin. Baffle or scoop plate 59 is provided extending from the lower portion of trough section 57 of pipe 55 downwardly to the inner surface of the wall of retention section 49 to assist in the feeding of dried material into the trough section 57 of pipe 55. A butterfly valve 60 is provided pivotally mounted at the inner extremity of trough section 57 on shaft 61 in suitable bearings 62 and 63 disposed at the opposite sides of pipe 55 at this point. Shaft 61 passes through the wall of section 50 and is provided with an adjusting crank 64 at its extremity, outside of the dryer drum. Butterfly valve 60 is of the same diameter as pipe 55 and may be so adjusted by handle 64 on the outer face of section 50 that it may be closed, partially opened or fully opened, as desired. A spring-pressed pin 65 is provided at the outer extremity of handle 64, registering with a quadrant 66 which carries a series of adjusting holes 67 into which its terminal extremity 68 fits so that the relative opening of butterfly valve 60 may be adjusted from outside the dryer to vary the amount of delivery through unloading pipe 55 into the discharge breaching 18. It will thus be seen that as fully dried material completes its passage through retention section 49 to the terminal extremity thereof it will be scooped into the open, trough-like section 57 of unloading pipe 55 and as rotation continues upwardly this material will be fed by gravity through section 57 thereof, past butterfly valve 60 and outwardly through angular section 56 of the unloading pipe, whence it falls by gravity through the open extremity 52 thereof into the receiving bin 70 in the lower extremity of discharge breaching 18. The great bulk of the dried material is collected in bin 70 of discharge breaching 18 whence it is appropriately removed for storage or sacking through valve 71. As shown in Fig. 1, valve 71 of discharge breaching 18 and valve 74 of cyclone 19 may be positioned over an endless conveyer to deliver the dried material thereto.

Material is not delivered to the lower extremity of unloading pipe 55 until it has passed completely through enlarged retention section 49 of the dryer and has been sufficiently dried therein. If it is desired to slow down or suspend mechanical unloading without stopping the rotation of the dryer, butterfly valve 60 of unloading pipe 55 may be partly or completely closed by means of handle 64 and may be maintained in this partly or fully closed condition as long as desired.

Duct 72 communicates between the upper extremity of discharge breaching 18 and cyclone 19 and duct 73 leads from cyclone 19 to fan 20.

Air velocity at the inner extremity of the exit cone 50 is very low and is substantially the same as the air velocity throughout the retention section 49. From the inner extremity of cone 50 air velocity increases gradually toward the discharge extremity of cone 50 into exit neck 51. This velocity increase is slow until immediately before the entrance into exit neck 51, where velocities build up rapidly. Thus, material particles must be carried by the low velocity air over substantially the full width of the exit cone 50 before reaching exit neck 51. The great balance of the particles will thus terminate their fall at the inlet end of the unloading pipe 55 adjacent the inner extremity of cone 50. Consequently, only extremely fine particles will be carried by the low velocity air stream far enough to be picked up by the high velocity air stream at the exit neck 51. The balance of the material, both fine and heavy particles, thus will be picked up by the unloading pipe, through which it is conveyed, without being affected by the high velocity air stream, into the lower part of discharge breaching 18 where it is unloaded by gravity and falls into collecting bin 70 at the bottom of the discharge breaching, whence it is removed through rotary unloading valve 71. Only extremely fine particles will be picked up by the high velocity air stream through the exit section 51 of the dryer and will be carried through discharge breaching 18 and duct 72 to cyclone 19, where they are separated by centrifugal effect and fall to the lower extremity of the cyclone to be unloaded through rotary air lock valve 74.

Thermocouple 75 is located at the upper extremity of discharge breaching 18 and acts to control the air temperature therein. Thermocouple 75 is in circuit with potentiometer 76 which in turn controls compressed air from compressor 35 to air motor 77 which actuates main damper 78, provided in duct 73 leading from cyclone 19 to exhaust fan 20, air motor 77 controlling the opening or closing of this damper depending upon the temperature of the exhaust gases. By providing this thermocouple control system for air motor 77 and damper 78 the proper air temperature differential between inlet breaching 33 and discharge breaching 18 is maintained at all times, the amount of drying air of a selected inlet temperature being regulated in such a way that it will cool down to the selected exhaust temperature.

As has previously been stated, inlet breaching 33 and backbox breaching 18 are provided at their opposed faces with elongate vertical openings to allow for vertical movement therein of entry neck 45 and discharge neck 51 of the dryer drum as the angular disposition of the dryer drum is varied. Mobile seals are provided about entry neck 45 and discharge neck 51 bearing closely against the outer peripheries of necks 45 and 51 and against the outer surfaces of inlet breaching 33 and backbox breaching 18 to maintain completely airtight seals at these vital points at all time. Detailed views of these mobile seals are disclosed in Figs. 7–10, inclusive, of the drawings. The seal structure will now be described in detail. As the seals at both the inlet breaching and the discharge breaching are identical only one of them will be described in detail. The seals comprise broadly an elongate plate 80 which is of greater length and width than the elongate face openings in breachings 33 and 18 and which fit closely thereover. Plates 80 are bored at their centers to closely and rotatably receive necks 45 and 51 of the dryer drum therethrough and are provided about their center peripheries, Fig. 9, with peripheral clamps 81 which are held thereto by bolts 82, clamps 81 being recessed at their extremities at 83 to retain therewithin circular asbestos seal strips 84 which are firmly clamped within clamps 81 at their outer extremities and which bear at their inner extremities against the outer peripheral surfaces of necks 45 and 51 to provide an airtight seal therebetween during rotation of necks 45 and 51. About their outer peripheries sealing plates 80 are provided with peripheral angular clamping means 85 which extend over the outer edges of plates 80 in rectangular section 86 and are maintained about the periphery of plates 80 by means of a series of bolts 87. Peripheral sealing strips 88 are clamped at their inner extremities under clamping ring 85 and are bent and bear at their outer extremities 89 against the face surfaces of the inlet breaching and backbox breaching to maintain an airtight seal between these surfaces and the outer periphery of breaching seal 80 at all times, regardless of movement of the breaching seals 80. Sealing strip members 84 and 88 are preferably formed of asbestos or other flexible, heat resistant material and may be reinforced at intervals by spring steel inserts, if desired. The suction in the dryer assists in keeping these seals tight.

Breaching seals 80 are maintained in position against the faces of the inlet and discharge breaching, about necks 45 and 51 of the dryer structure, by the following novel positioning structure. Affixed to the outer faces of the breaching seals 80 on shafts rectangularly disposed with respect thereto are four master rollers 90, 91, 92 and 93 which are disposed about the outer periphery of the central circular orifice in breaching seal 80, through which the neck of the dryer fits, in such fashion that rollers 90, 91, 92 and 93 bear closely against the outer peripheral surface of necks 45 and 51 to support the seal thereon and to assure its movement up and down therewith as the necks are moved upwardly or downwardly. The provision of these rollers on seal 80 assures movement of the seal upwardly or downwardly without interference with the rotative movement of necks 45 and 51. Vertical tracks 95 and 96 are provided on the face of the breachings outwardly of the lateral edges of sealing plate 80 and are appropriately affixed to these faces as by bolting or welding, to limit the lateral movement of sealing plate 80. As shown in Fig. 10, these tracks are channel shaped and are designed to receive terminal rollers 97, 98, 99 and 100 of cross rod members 101 and 102 which are fitted across the outer, upper and lower surfaces of sealing plates 80, respectively above and below the axles of master rollers 90, 91, 92 and 93. Cross rods 101 and 102 are maintained in proper position across the upper and lower surfaces of seal 80 by means of a series of small, fixed, rectangular rollers 103—104, 105—106, 107—108, 109—110 which are affixed to the outer surface of seal 80 and rotatably mounted parallel thereto on short rectangular shafts thereon in such paired proximity to each other, as shown, that cross rods 101 and 102 closely and slidably engage between them, respectively, and are maintained in position across seal 80 thereby. Cross rods 101 and 102 are also provided with small rectangularly disposed rollers 111—112, 113—114, 115—116, 117—118, respectively, which bear rectangularly against the outer surface of seal 80 to allow for slight lateral movement therebetween and to maintain seal 80 at all times pressed in close and airtight contact through seal 88 with the outer surface of the breaching. It will thus be seen that as the terminal rollers, 97, 98, 99 and 100 of cross rods 101 and 102, respectively, rotatably move within the channels of vertical supports 95 and 96 and as cross rods 101 and 102 are maintained properly in position across the outer surface of seal 80 by rollers 102–110, inclusive, and as they are provided with vertically disposed rollers 111–118, inclusive, that the seal structure may be moved vertically as desired through main rollers 90, 91, 92 and 93 which bear against the peripheries of the necks 45 and 51 and that airtight seals will be provided at all times about the outer peripheries of the necks by peripheral seal 84 and about the outer surface of the breachings by peripheral outer seal 85 of the sealing plate 80. Thus, as the angular inclination of the entire dryer structure is varied, depending upon the delivery speed desired, the breaching seals 80 will at all times maintain completely airtight connections about the outer peripheries of the necks 45 and 51 and against the surfaces of the inlet and backbox breachings. This seal structure was designed to afford a positive seal at all times at the inlet and discharge necks of the dryer structure and at the same time to do so without any interference to either the rotative or angular movement of the dryer.

Figure 11:
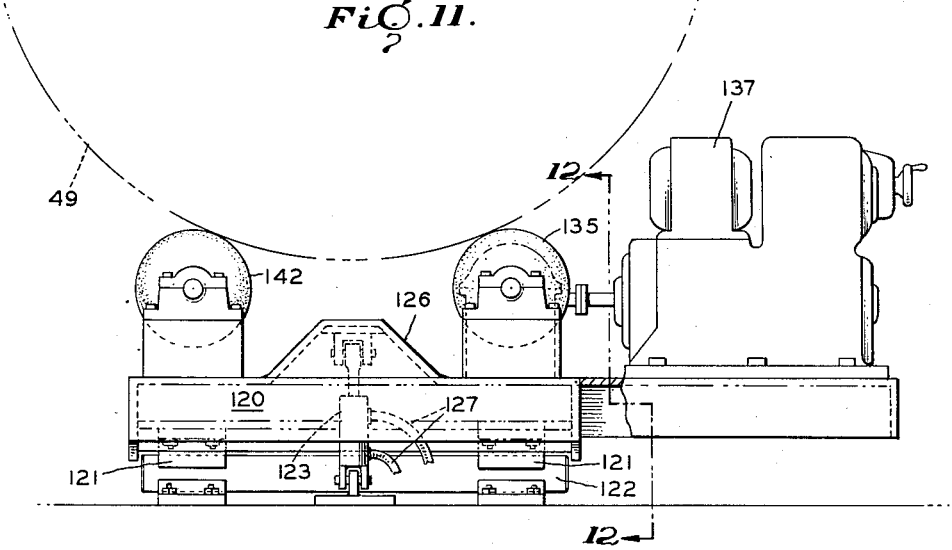
Fig. 11 is an end elevation of the drive base for the dryer, showing the drive for the drive rollers and the idler rollers and showing the pivotal mounting of the base structure.
Figure 12:
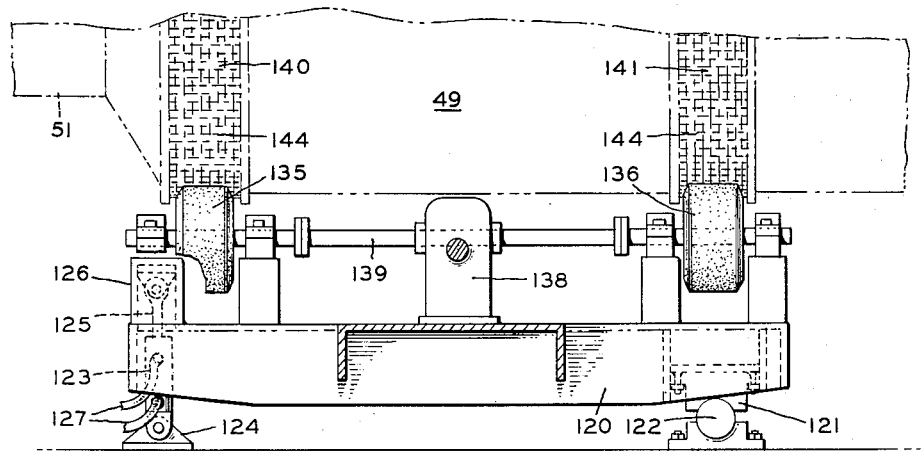
Fig. 12 is a sectional view of the base structure taken on line 12—12 of Fig. 11.

The mounting and drive structure for the dryer 16 embodies a number of novel features and will now be described in detail. The dryer drum itself is a massive structure constructed of heavy gauge steel and obviously requires a stable and positive support and a positive drive to maintain it in the desired position and to maintain the desired speed of rotation of from 1.5 to 6 R. P. M. The new and improved support and drive means for the drum must therefore be of great strength and stability and should also be angularly adjustable in the line of the longitudinal axis of the drum so that the desired inclination therefor may be provided with ease. To this end, referring to Figs. 1, 11 and 12, the base 120 for the support and drive mounting comprises a massive steel platform which is roughly rectangular in shape and which is supported at one extremity on bearings 121 by means of axle 122 which passes under the base of support 120 and is mounted at its extremities in bearings 121. Adjacent one extremity of base 120 a hydraulic jack structure 123 is provided pivotally mounted on a base 124 and carrying a piston rod 125 which is pivotally affixed at its upper extremity in a recessed bracket 126 provided in base 120. By virtue of this pivotal mounting in bearings 121 and the provision of hydraulic jack 123 the angularity from the horizontal of base 120 may be controlled at will through a hydraulic system 127 which is controlled by a manual valve control 128, the hydraulic system being supplied through motor 129 and pump 130. An inductance bridge system is provided at 131 actuated through a fixed lever 132 and registering through a circuit 133 on inclinometer indicator 134 to indicate the inclination of the dryer above or below horizontal, for remote operation. As the hydraulic system is actuated through manual control 128 and jack 123 to vary the angularity of the dryer drum above or below horizontal the inductance bridge system is actuated to register this inclination on inclinometer indicator 134 thus indicating at all times the inclination of the dryer drum from the horizontal.

The dryer drum is rotated through a pair of drive rollers 135 and 136 which are driven from an electric motor 137 through a gear reduction box 138 and drive shaft 139 which are all fixedly mounted, as shown, on base 120. Drive rollers 135 and 136 are preferably provided with heavy neoprene tires to assure a positive drive without slippage and to withstand heat from the dryer and eliminate creation of sparks. These tires grip the scored surfaces of the drive bands 140 and 141, provided about the terminal peripheries of enlarged retention section 49 of the dryer drum. Idler rollers 142 and 143, also provided with heavy neoprene tires to withstand heat, are also mounted on base 120 in alignment with drive rollers 135 and 136, respectively, and registering with drive bands 140 and 141 to provide a firm base support for the dryer drum on base 120. Drive bands 140 and 141 are preferably heavily flanged at their edges and are scored with a peripheral series of small rectangular projections 144 which tend to bite into the neoprene surfaces of drive rollers 135 and 136 and idler rollers 142 and 143 to maintain the drive for the rotating drum positive at all times and to prevent slippage and loss of traction. Drive bands 140 and 141 are preferably of slightly greater width, between their peripheral flanges, than the drive and idler rollers.

It will thus be seen that the drying drum is cradled between drive rollers 135 and 136 and idler rollers 142 and 143 on base 120 and is rotatably supported thereby in stable and rotative position regardless of the inclination of base 120. The provision of the heavy neoprene tires on the drive and idler rollers counteracts heat, eliminates sparks and maintains the entire dryer structure in stable rotative condition at all times.

The speed of rotation is normally from 1.5 to 6 R. P. M., depending upon the nature of the material being dried, and the inclination of the base 120 may be varied 6°, i. e., 3° above horizontal or 3° below horizontal. If the dryer drum is moved upwardly through base 120 at the inlet end the outlet extremity of the drum will be inclined downwardly an equal angular amount and the speed of delivery of the dried material to the extremity of enlarged retention section 49 will be proportionately increased. Conversely, if the dryer drum is inclined downwardly at its inlet extremity the delivery end thereof will be inclined upwardly an equal amount and the speed of delivery of the material to the extremity of retention section 49 will be proportionately decreased. Thus, where it is desired to slow down the passage of the material being dried through the dryer the inlet end thereof is depressed, the discharge end being raised, and the degree of speed of passage of the material through the dryer drum may be reduced as desired. The converse is true if it is desired to speed delivery of the material through the dryer drum.

The flight disposition in preliminary drying section 47 and in retention section 49 is shown in Figs. 2, 3 and 4 of the drawing. It will be seen that the flights $f^1$, $f^2$ and $f^3$ extend longitudinally of the drum sections and are preferably regularly alternated in sequence as shown: $f^1$, straight flight, $f^2$, angular flight, $f^3$, rectangular flight. The flights in section 47 are longer and more closely spaced than those in section 49 to provide a heavier showering of the material in section 47 than in section 49, where slower heat transfer and less showering are required, at the same time reducing power requirements.

As has been previously stated, air temperature and velocity are at their highest in entry neck 45, where the heated air from the furnace and the temperature-sensitive material entrained thereby enter the dryer. In this narrow neck a large percentage of the moisture is instantaneously evaporated under the highest velocity and temperature conditions. As the surfaces of the entering particles are more or less saturated the wet bulb temperature stays low and prevents the material from being damaged in entry neck 45. From neck 45 the material is moved into larger diameter section 47 where its speed slows down with air speed and the rate of evaporation is slower due to lower temperature and air-vapor velocity. In this section the surfaces of the particles are partially dried. From section 47 the particles pass into large diameter retention section 49 where air speed and temperature are low. Partially dried particles are retained in retention section 49 until sufficiently dried, at which time they will have approached the extremity of section 49 where they are picked up by the scoop end 57 of unloading pipe 55 and are delivered therefrom by gravity into the discharge bin in the base of discharge breaching 18. Only the extremely fine, dry particles are light enough to be carried by the low velocity air towards the inlet extremity of neck 51, at which point they will be picked up by the air stream of high velocity passing through neck 51 and then carried through discharge breaching 18 and conduit 72 into cyclone 19 where they fall out of the air stream and are collected in the bottom portion of cyclone 19 for delivery to storage or sacking.

Exhaust fan 20, which is shown communicating with duct 73 beyond cyclone 19 is preferably of the non-material handling type and is sealed and maintains the furnace and dryer under a negative pressure whereby air is pulled through the furnace through louvers 30 and by-pass louvers 31 into the entry neck of the dryer. If desired, a material handling fan may be used positioned between the discharge breaching 18 and the cyclone 19. Fan 20 is driven by a suitable motor and should be capable of handling up to 15,000 C. F. M. of air at 200° F. and must be able to operate under up to 400° F. temperature.

The novel unloading pipe structure at the delivery end of the dryer eliminates "dusting" and further reduces losses while controlling the output of the dryer, as desired.

Where the material is of such nature as to be easily dried the angular inclination of the discharge end of the dryer may be increased to speed delivery of the material through the retention section thereof and to increase the output of the dryer. Where the materal does not readily surrender its moisture drying time may be proportionally increased by reversing this inclination. Thermocouples 32 and 75 and their control systems are provided to maintain optimum temperatures at both ends of the dryer and do so as has been hereinbefore discussed. These temperature ranges may be varied as desired, depending upon the material being dried.

The diameters of the various sections of the dryer are preferably as follows, but may be varied widely as long as their proper relationship is maintained. Thus, entry neck 45 may be three feet six inches in diameter, preliminary drying section 47 may be 7 feet in diameter, retention section 49 may be 9 feet in diameter and exit neck 51 may be three feet six inches in diameter. These dimensions may be varied as desired, providing the relative diameters between these sections are substantially maintained.

The dimensions of the dryer may be varied within wide limits without departing from the spirit of this invention.

Equivalents may be substituted for the various controls shown without departing from the spirit of the invention.

The foregoing specification is by way of illustration of one embodiment of the invention only. Attention is directed to the appended claims for a limitation of the scope of the invention.

What is claimed is:

1. In an improved dryer, a headbox structure, a heater housing disposed outwardly thereof and communicating therewith, a heater in said housing, control louvers in the face of said housing controlling the flow of air over said heater into said headbox, an orifice centrally disposed of the face of said headbox, a dryer drum horizontally disposed adjacent said headbox comprising a narrow entry neck fitting within said orifice, an enlarged preliminary drying section, a further enlarged and elongated retention section and a narrow discharge neck, a pivotally mounted support platform for said dryer drum, paired drive and idler rollers on said platform rotatably supporting said dryer drum, a backbox adjacent the discharge neck of said dryer drum and provided with a central orifice receiving the discharge neck thereof, a seal plate slidably mounted on the face of said headbox over said headbox orifice and about the entry neck of said dryer drum, a seal plate slidably mounted on said backbox over said backbox orifice and about the discharge neck of said dryer drum, a cyclone separator adjacent said backbox, a duct leading from said backbox communicating with said cyclone separator, fan means adjacent said cyclone separator, a duct connecting said fan means and said cyclone, a damper in said duct, whereby said dryer drum is completely sealed at each extremity and the flow of heated air therethrough is governed by said damper and by the control louvers in the face of said heater housing.

2. In an improved dryer, a headbox structure, a heater housing disposed outwardly thereof and communicating therewith, a heater in said housing, control louvers in the face of said housing controlling the flow of air over said heater into said headbox, an orifice centrally disposed in the face of said headbox, a dryer drum horizontally disposed adjacent said headbox comprising a narrow entry neck fitting within said orifice, an enlarged preliminary drying section, a further enlarged and elongated retention section and a narrow discharge neck, a pivotal support platform for said dryer drum, paired drive and idler rollers on said platform rotatably supporting said dryer drum, a backbox adjacent the discharge neck of said dryer drum provided with a central orifice receiving the discharge neck thereof, an elongate, centrally orificed seal plate carrying peripheral sealing rings about its outer and center peripheries slidably mounted on the face of said headbox over said headbox orifice and about the entry neck of said dryer drum, an elongate, centrally orificed seal plate carrying peripheral sealing rings about its outer and center peripheries slidably mounted on said backbox over said backbox orifice and about the discharge neck of said dryer drum, a cyclone separator adjacent said backbox, a duct leading from said backbox communicating with said cyclone separator, fan means adjacent said cyclone separator, a duct connecting said fan means and said cyclone, a damper in said duct, whereby said dryer drum is completely sealed at each extremity and the flow of heated air therethrough is governed by said damper and the control louvers in the face of said heater housing.

3. In an improved dryer, a dryer drum comprising a narrow entry neck, an enlarged preliminary drying section adjacent said entry neck, a further enlarged and elongated retention section adjacent said preliminary drying section, and a small discharge neck adjacent said retention section, a headbox at the entry extremity of said drum orificed at its center face to receive the extremity of said entry neck of said drum, a furnace housing disposed at the face of said headbox and communicating therewith, a furnace in said housing, control louvers in said housing to control the flow of air over said furnace into said headbox, a slidable orificed seal plate closely fitting the face of said headbox over said orifice and about the entry neck of said dryer drum, heat resistant sealing strips about the outer and inner peripheries of said seal plate, a backbox adjacent the discharge end of said dryer drum centrally orificed to receive the discharge neck of said dryer drum, a seal plate slidably affixed to the face of said backbox over said orifice and about the discharge neck of said dryer drum, heat resistant sealing strips about the inner and outer peripheries of said seal plate bearing against the face of said backbox and the outer periphery of the discharge neck of said dryer drum, a fan in communication with said backbox, whereby said drum is sealed at both extremities and receives only air passing through said control louvers in said furnace housing.

4. In an improved dryer drum, a narrow entry neck, a preliminary drying section of substantially twice the length and diameter of said entry neck adjacent said entry neck, an enlarged retention section of approximately twice the cross-sectional area and length of said preliminary drying section adjacent said preliminary drying section, a narrow discharge neck adjacent said retention section and an unloading pipe of trough configuration at its lower end affixed within the extremity of said retention section and extending outwardly therefrom through said discharge neck.

5. In an improved dryer drum, a narrow entry neck, a preliminary drying section of substantially twice the length and diameter of said entry neck adjacent said entry neck, an enlarged retention section of approximately twice the cross-sectional area and length of said preliminary drying section adjacent said preliminary drying section, a narrow discharge neck adjacent said retention section and a cylindrical unloading pipe bisected into a scoop portion at its lower extremity affixed at its lower extremity within said retention section of said drum and extending outwardly therefrom through said discharge neck, a valve in said unloading pipe and means affixed to said valve and extending outwardly of said drum for adjusting said valve in said unloading pipe.

6. In an improved dryer, a dryer drum comprising a narrow entry neck, an enlarged preliminary drying section adjacent said entry neck, a further enlarged and elongated retention section adjacent said preliminary drying section, a narrow discharge neck adjacent said retention section, a headbox adjacent said entry neck provided with an elongate orifice in its face to receive said entry neck, a seal plate slidably mounted on the face of said headbox over said orifice and about the entry neck of said drum, a backbox adjacent said discharge neck provided with an elongate orifice in its face to receive said discharge neck, a seal plate slidably mounted on the face of said backbox over said orifice and about the discharge neck of said drum whereby the connections between the necks of said drum and said headbox and backbox are maintained airtight.

7. In an improved dryer, a dryer drum comprising a narrow entry neck, an enlarged preliminary drying section adjacent said entry neck, a further enlarged and elongated retention section adjacent said preliminary drying section, a narrow discharge neck adjacent said retention section, a platform supporting said dryer drum pivotally mounted at one extremity, drive and idler rollers for supporting said drum rotatably mounted on said platform, means associated with said platform for varying its angularity, a headbox adjacent said entry neck provided with an elongate orifice in its face to receive said entry neck, a seal plate slidably mounted on the face of said headbox over said orifice and about the entry neck of said drum, a backbox adjacent said discharge neck provided with an elongate orifice in its face to receive said discharge neck, a seal plate slidably mounted on the face of said backbox over said orifice and about the discharge neck of said drum whereby the connections between the necks of said drum and said headbox and backbox are maintained airtight.

8. In an improved dryer drum, a narrow entry neck, a preliminary drying section of substantially twice the length and diameter of said entry neck adjacent said entry neck, an enlarged retention section of approximately twice the cross-sectional area and length of said preliminary drying section adjacent said preliminary drying section, a narrow discharge neck adjacent said retention section, a pivotally mounted support platform for said dryer drum, paired drive and idler rollers on said platform rotatably supporting said dryer drum and an unloading pipe of trough configuration at its lower end affixed within the extremity of said retention section and extending outwardly therefrom through said discharge neck.

9. In an improved dryer drum, a narrow entry neck, a preliminary drying section of substantially twice the length and diameter of said entry neck adjacent said entry neck, an enlarged retention section of approximately twice the cross-sectional area and length of said preliminary drying section adjacent said preliminary drying section, a narrow discharge neck adjacent said retention section, longitudinal flights extending the length of said preliminary drying section in close proximity to each other and arranged in the sequence, straight, angular and rectangular, shorter flights extending the length of said retention section and arranged in the same sequence and an unloading pipe of trough configuration at its lower end affixed within the extremity of said retention section and extending outwardly therefrom through said discharge neck.

10. In an improved dryer structure, a dryer drum comprising a narrow entry neck, an enlarged preliminary drying section of comparatively short length, a retention section of greatly enlarged diameter and length, an exit neck of reduced diameter, a headbox for said dryer disposed adjacent said entry neck and elongately orificed to receive the extremity thereof, a furnace within said headbox, louvers in the outer face of said headbox to control the flow of air to said furnace, control means for said louvers in said headbox, feed means affixed to said headbox and communicating therethrough with the entry neck of said dryer drum, a sealing plate slidably mounted on the face of said headbox over said elongate orifice and about the entry neck of said dryer drum providing an airtight seal thereabout, a backbox adjacent the delivery end of said drum elongately orificed at its face to slidably receive the exit neck of said drum, a delivery pipe affixed in said retention section of said drum and extending through said exit neck thereof into said backbox, a sealing plate slidably affixed to the face of said backbox over said elongate orifice and about said exit neck of said drum, a cyclone separator adjacent said backbox, a duct connecting said backbox and said cyclone separator, a fan in communication with said cyclone, means for driving said fan whereby air is pulled into said dryer over said furnace to pull moist material from said feed means through said dryer drum.

11. In an improved dryer structure, a dryer drum comprising a narrow entry neck, an enlarged preliminary drying section of comparatively short length, a retention section of greatly enlarged diameter and length, an exit neck of reduced diameter, a pivotally mounted base for supporting said dryer drum, neoprene drive rollers rotatably mounted on said base, drive means for driving said rollers mounted on said base, neoprene idler rollers rotatably mounted on said base aligned with said drive rollers thereon and supporting said dryer drum thereon, drive bands extending about the extremities of said retention section of said drum and frictionally engaging said drive and idler rollers, a jack affixed to said base to vary the angularity of said base and said dryer supported thereby, a headbox for said dryer disposed adjacent said entry neck and elongately orificed to receive the extremity thereof, a furnace within said headbox, a backbox adjacent the delivery end of said drum elongately orificed at its face to slidably receive the exit neck of said drum, an angular delivery pipe affixed in said retention section of said drum and extending through said exit neck thereof into said backbox, a cyclone separator adjacent said backbox, a duct connecting said backbox and said cyclone separator, a fan in communication with said cyclone, means for driving said fan whereby air is pulled into said dryer over said furnace to pull moist material through said dryer drum.

12. In an improved dryer structure, a dryer drum comprising a narrow entry neck, an enlarged preliminary drying section of comparatively short length, a retention section of greatly enlarged diameter and length, an exit neck of reduced diameter, elongate flights extending the length of said preliminary drying section in close proximity to each other and arranged in the sequence straight, angular and rectangular, shorter flights extending the length of said retention section more widely spaced than the foregoing flights and arranged in the same sequence, a pivotally mounted base for supporting said dryer drum, paired neoprene drive and idler rollers rotatably mounted on said base, means for driving said drive rollers on said base, drive bands extending about the extremities of said retention section of said drum and registering with said drive and idler rollers, an extensible jack affixed to said base to vary the angularity of said base and said dryer supported thereby, a furnace adjacent the entry neck of said drum, a delivery pipe affixed in said retention section of said drum and extending through said exit neck thereof, a cyclone separator communicating with the exit neck of said drum, a fan in communication with said cyclone, means for driving said fan whereby air is pulled into said dryer over said furnace to pull moist material through said dryer drum.

13. In an improved dryer structure, a dryer drum comprising a narrow entry neck, an enlarged preliminary drying section of comparatively short length, a retention section of greatly enlarged diameter and length, an exit neck of reduced diameter, elongate flights extending the length of said preliminary drying section in close proximity to each other and arranged in the sequence straight, angular and rectangular, shorter flights extending the length of said retention section more widely spaced than the foregoing flights and arranged in the same sequence, a pivotally mounted base for supporting said dryer drum, paired drive and idler rollers rotatably mounted on said base, means for driving and drive rollers on said base, corrugated and laterally shouldered drive bands extending about the extremities of said retention section of said drum and registering with said drive and idler rollers, jack means affixed to said base to vary the angularity of said base and said dryer supported thereby, a headbox for said dryer disposed adjacent said entry neck and elongately orificed to receive the extremity thereof, a furnace within said headbox, louvers in the outer face of said headbox to control the flow of air to said furnace, control means for said louvers in said headbox, feed means affixed to said headbox and communicating therethrough with the entry neck of said dryer drum, a sealing plate slidably mounted on the face of said headbox over said elongate orifice and about the entry neck of said dryer drum providing an airtight seal thereabout, a backbox adjacent the delivery end of said drum elongately orificed at its face to slidably receive the exit neck of said drum, a delivery pipe affixed in said retention section of said drum and extending through said exit neck thereof into said backbox, a sealing plate slidably affixed to the face of said backbox over said elongate orifice and about said exit neck of said drum, a cyclone separator adjacent said backbox, a duct connecting said backbox and said cyclone separator, a fan in communication with said cyclone, means for driving said fan whereby air is pulled into said dryer over said furnace to pull moist material from said feed means through said dryer drum.

References Cited in the file of this patent
UNITED STATES PATENTS

| | | |
|---|---|---|
| 2,322,272 | Bailey et al. | June 22, 1943 |
| 2,397,091 | Davis | Mar. 26, 1946 |
| 2,715,283 | Halldorsson | Aug. 16, 1955 |

OTHER REFERENCES

Roto-Louvre Publication received in Division 49, U. S. Patent Office July 22, 1941, pp. 18 and 19.